(12) United States Patent
Segura et al.

(10) Patent No.: US 9,278,510 B2
(45) Date of Patent: Mar. 8, 2016

(54) METHOD FOR PRODUCING A CARD BODY

(75) Inventors: Maria del Mar Segura, Sant Pere de Ribes Barcelona (ES); Gemma Redondo, Cornella de Llobregat Barcelona (ES)

(73) Assignee: GIESECKE & DEVRIENT GMBH, Munich (DE)

( * ) Notice: Subject to any disclaimer, the term of this patent is extended or adjusted under 35 U.S.C. 154(b) by 266 days.

(21) Appl. No.: 14/234,275

(22) PCT Filed: Jul. 24, 2012

(86) PCT No.: PCT/EP2012/003117
§ 371 (c)(1),
(2), (4) Date: Jan. 22, 2014

(87) PCT Pub. No.: WO2013/013810
PCT Pub. Date: Jan. 31, 2013

(65) Prior Publication Data
US 2014/0174645 A1 Jun. 26, 2014

(30) Foreign Application Priority Data
Jul. 26, 2011 (DE) .......................... 10 2011 108 531

(51) Int. Cl.
*B29C 65/52* (2006.01)
*B32B 37/12* (2006.01)
(Continued)

(52) U.S. Cl.
CPC .............. *B32B 37/206* (2013.01); *B32B 37/203* (2013.01); *B32B 38/00* (2013.01); *B42D 25/00* (2014.10); *G06K 19/077* (2013.01); *B32B 38/0004* (2013.01); *B32B 38/145* (2013.01);
(Continued)

(58) Field of Classification Search
USPC ......... 156/247, 277, 305, 307.1, 307.3, 307.7
See application file for complete search history.

(56) References Cited

U.S. PATENT DOCUMENTS 5,394,609 A * 3/1995 Ferguson ............. H01R 43/205
228/180.21
6,248,199 B1 6/2001 Smulson
(Continued)

FOREIGN PATENT DOCUMENTS

CN 101121310 A 2/2008
CN 201220492 Y 4/2009
(Continued)

OTHER PUBLICATIONS

Composite Engineering, "Carbon Fibre/Epoxy vs Fibreglass/polyester," URL: http://eng-tips.com/viewthread.cfm?qid=262866, Jul. 11, 2012, pp. 1-4.
(Continued)

*Primary Examiner* — Sing P Chan
(74) *Attorney, Agent, or Firm* — Workman Nydegger

(57) ABSTRACT

A method is for manufacturing a stiff, multilayered card body for a portable data carrier, has steps including: making available a layer of an opaque plastic, making available a carbon fiber layer of carbon fiber fabric, impregnating the carbon fiber layer with epoxy resin, fusing the layers to form a half-product, printing the upper side of the carbon fiber layer of the half-product with a graphic pattern in a screen printing process or an offset printing process, laminating a plastic layer onto the printed upper side, and detaching the card body from the half product by means of a separating tool guided relative to the half-product along a path describing the edge contour of the card body.

11 Claims, 2 Drawing Sheets

(51) Int. Cl.
  *B32B 37/18* (2006.01)
  *B32B 38/10* (2006.01)
  *B32B 38/14* (2006.01)
  *B32B 43/00* (2006.01)
  *B32B 37/20* (2006.01)
  *B32B 38/00* (2006.01)
  *G06K 19/077* (2006.01)
  *B42D 25/00* (2014.01)

(52) U.S. Cl.
  CPC ..... *B32B 2038/0076* (2013.01); *B32B 2250/40* (2013.01); *B32B 2262/106* (2013.01); *B32B 2307/41* (2013.01); *B32B 2309/02* (2013.01); *B32B 2309/105* (2013.01); *B32B 2327/06* (2013.01); *B32B 2425/00* (2013.01)

(56) References Cited

U.S. PATENT DOCUMENTS

| | | | |
|---|---|---|---|
| 6,333,113 B2 | 12/2001 | Sugie et al. | |
| 7,083,108 B2* | 8/2006 | Silverbrook | B41J 3/445 235/454 |
| 7,110,139 B2* | 9/2006 | Silverbrook | B41J 2/14314 348/E5.024 |
| 7,431,446 B2* | 10/2008 | Silverbrook | B41J 2/14314 347/104 |
| 7,524,045 B2* | 4/2009 | Silverbrook | B41J 3/445 101/327 |
| 7,775,655 B2* | 8/2010 | Silverbrook | B41J 2/14314 347/104 |
| 7,883,748 B2 | 2/2011 | Hasegawa et al. | |
| 8,669,325 B1* | 3/2014 | Hyman | B44F 1/00 257/40 |
| 8,754,333 B2* | 6/2014 | Yoshimura | B29C 70/46 174/255 |
| 8,945,328 B2* | 2/2015 | Longinotti-Buitoni | A61B 5/0002 156/234 |
| 2001/0018111 A1 | 8/2001 | Sugie et al. | |
| 2003/0137723 A1 | 7/2003 | Sander | |
| 2006/0072030 A1* | 4/2006 | Silverbrook | B41J 2/14314 348/345 |
| 2006/0124234 A1 | 6/2006 | Hasegawa et al. | |
| 2006/0158519 A1* | 7/2006 | Silverbrook | B41J 2/14314 348/207.2 |
| 2006/0214012 A1* | 9/2006 | Silverbrook | B41J 3/445 235/494 |
| 2008/0309746 A1* | 12/2008 | Silverbrook | B41J 2/14314 347/102 |
| 2010/0051323 A1* | 3/2010 | Yokouchi | B82Y 10/00 174/250 |
| 2010/0176090 A1 | 7/2010 | Lochtman et al. | |
| 2012/0024586 A1* | 2/2012 | Yoshimura | H05K 1/036 174/264 |
| 2012/0097442 A1* | 4/2012 | Yoshimura | B29C 70/46 174/262 |
| 2014/0318699 A1* | 10/2014 | Longinotti-Buitoni | A61B 5/0002 156/247 |
| 2015/0125829 A1* | 5/2015 | Hyman | B44C 3/046 434/81 |
| 2015/0143601 A1* | 5/2015 | Longinotti-Buitoni | A61B 5/0002 2/69 |
| 2015/0148476 A1* | 5/2015 | Thetford | C08G 69/48 524/570 |
| 2015/0151515 A1* | 6/2015 | Skepton | A45C 11/00 428/43 |

FOREIGN PATENT DOCUMENTS

| | | |
|---|---|---|
| CN | 101457483 A | 6/2009 |
| DE | 10202125 A1 | 7/2003 |
| EP | 0857749 A1 | 8/1998 |
| JP | 05062031 A | 3/1993 |
| JP | 2006027091 A | 2/2006 |
| WO | 2008142064 A1 | 11/2008 |

OTHER PUBLICATIONS

DE Examination Report for corresponding DE Application No. 102011108531.2, mailed Jul. 11, 2012.
International Search Report for corresponding International PCT Application No. PCT/EP2012/003117, mailed Oct. 24, 2012.
Wikipedia, "Carbon-Fiber-Rienforced Polymer," URL: http://en.wikipedia.org/w/index.php?title=Carbon-fiber-rienforced_polymer&oldid=440485973, Jul. 11, 2012, pp. 1-7.
Chinese Search Report from Application No. CN 2012800365353, Oct. 21, 2014.

* cited by examiner

METHOD FOR PRODUCING A CARD BODY

BACKGROUND

The invention relates to the manufacture of a card body for portable data carriers that is based on carbon fiber. In particular, the invention relates to the manufacture of card bodies for portable data carriers in the credit card format or chip card format.

SUMMARY

Card-shaped portable data carriers in the credit card format are widespread. They are used in particular as cash cards or identification cards or, in smaller formats, as authentication cards or memory cards. The majority of cards is equipped with a magnetic stripe and/or a microprocessor, as well as a data interface for reading devices, which make it possible to carry out data processing tasks with the aid of the card. The microprocessor ICs are executed, i.a. through a very small size, to be particularly tamper-proof, but have strongly reduced computing power in comparison to standard microprocessors for example for PCs, they are thus limited in resources. Cards of the mentioned type as a rule have no or at best a reduced user interface, for example in the form of a single-line display and/or a small number of keys and/or a sensor for capturing a biometric feature. The manufacture of cards of the above-mentioned type is also well-known, e.g. from the "Handbuch der Chipkarten" ["Handbook of chip cards"], W. Rankl, W. Effing, 5th edition, 2008, Karl Hanser Verlag Munich, or the book "Vom Plastik zur Chipkarte" ["From plastic to the chip card"], T. Tarantino, Y. Haghiri, 1999, Karl Hanser Verlag Munich. Accordingly, the cards are typically constructed from several layers of plastic that are bonded with each other by lamination. Usual plastics are in particular PVC, polycarbonate or polyester-based plastics. It is also known to utilize paper or biodegradable materials for card construction. A common alternative to the lamination of multilayered cards is the manufacture of cards by injection molding. The known manufacturing methods permit a cost-efficient large-scale manufacture of cards in accordance with the respectively relevant standards, for example the standard ISO 7810 for chip cards.

The properties of the cards manufactured according to the known methods, in particular the physical and haptic properties, can be influenced within a certain spectrum by selecting suitable materials. For example a higher or lower flexural stiffness can be manufactured or harder or softer surfaces can be created. Also the weight of a card can be influenced within certain limits. Although quite substantial latitude is thus given for the physical design of the cards, there is nevertheless the need to create further card embodiments that differ from the known ones.

From JP 05-062031 A the suggestion is known to manufacture IC cards whose card body is similarly stiff as the IC module, so that said module is not detached from the module cavity even upon repeated bending loads. For this purpose a carbon-fiber aluminum alloy is employed as card substrate. A particular manufacturing process is not provided.

From DE 102 02125 A1 a multilayered chip card having an energy storage is further known, wherein at least one layer above and/or below the energy storage is executed as a high-strength foil. The high-strength foil can be a carbon-fiber composite material. The high-strength foil covers in particular the energy storage and has prefabricated gaps above some components of the chip card. It can be bonded with the energy storage by adhesion or hot lamination. The high-strength foil ensures that the complete chip card has a high stability against bending loads and pressure loads, in particular in the region of the energy storage. Two high-strength foils can be provided on both sides of the energy storage.

It is the object of the invention to specify a method by which a card can be manufactured which clearly differs from known cards with regard to its physical and haptic condition.

This object is achieved by a method having the features of the main claim. A card body manufactured in accordance with the method according to the invention has a particularly high stiffness and is easily identifiable by the sound arising upon falling on hard ground with impingement on a corner or an edge. The method according to the invention has the advantage that the manufactured card discloses the employed carbon fiber material while nevertheless having sufficiently high opacity. It further has the advantage that the edges of the manufactured card bodies are smooth and in particular no fraying of the employed carbon fiber material takes place.

In a preferred embodiment a plastic layer, preferably of PVC, is incorporated between two carbon fiber layers to produce the carbon-fiber core layer. In a preferred embodiment further both outer surfaces are covered by a transparent plastic layer that is laminated on.

An embodiment of the invention will hereinafter be explained in more detail with reference to the drawing.

DETAILED DESCRIPTION OF VARIOUS EMBODIMENTS

For the following description it is assumed that a card body for a chip card is manufactured, having the usual outside dimensions in accordance with the standard 7810-length: 85.72 mm, width: 54.03 mm, thickness: 0.76 mm. However, the method can be used likewise for manufacturing portable data carriers having other dimensions. For example also portable data carriers in the smaller SIM card format, the so-called ID-000 format, can be produced in the same fashion, or likewise thicker portable data carriers in an elongated rectangular shape, which serve e.g. as a USB stick together with a housing.

Figure 1:
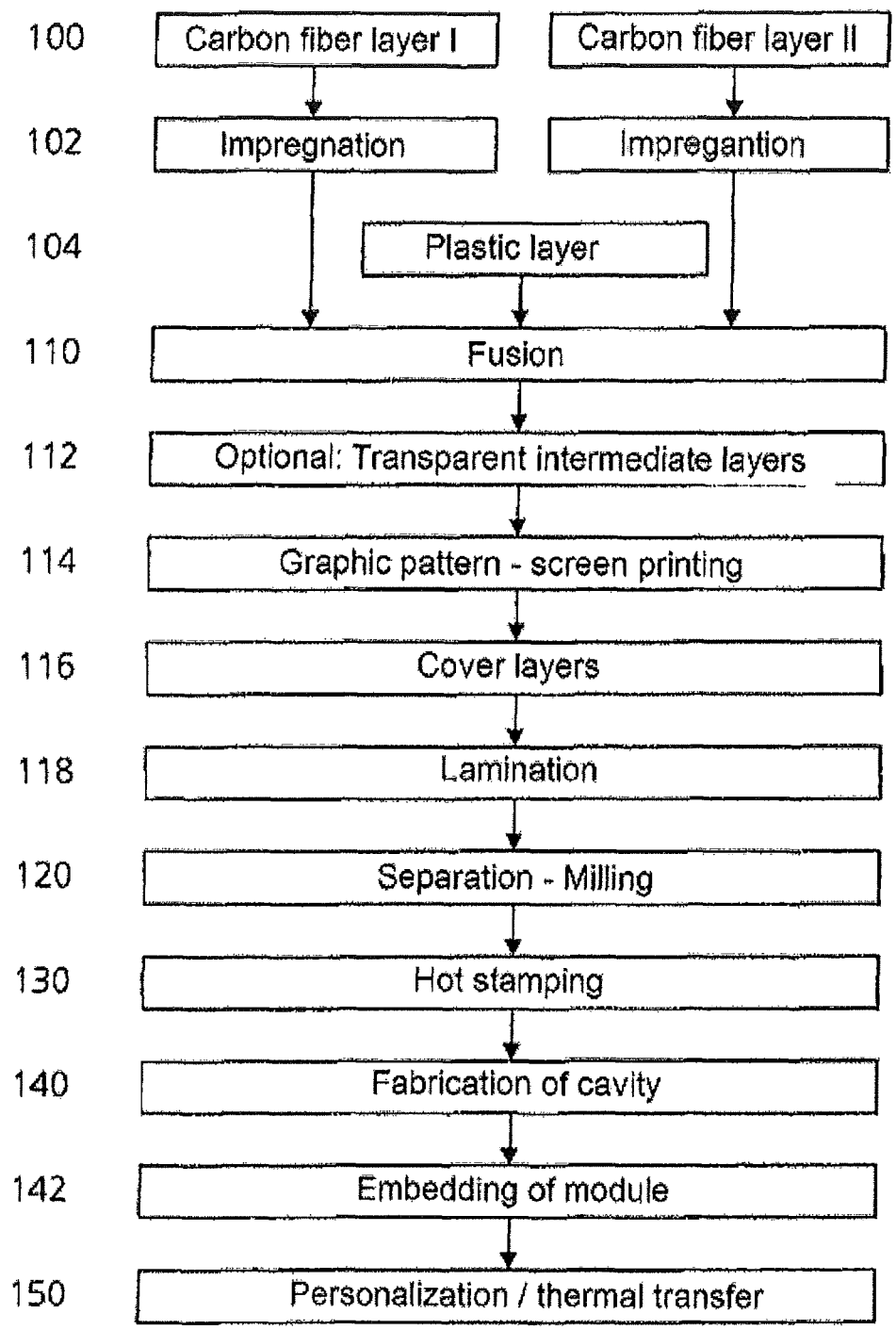
FIG. 1 a flow chart of the manufacture of a card body.

The method is illustrated in the form of a flow chart in FIG. 1. It starts by making available, step 100, preferably two carbon fiber layers 2, 4 of a thickness of 50 to 300 μm. The carbon fiber layers 2, 4 can be present in the form of netted mats. The carbon fiber layers 2, 4 are subsequently impregnated by immersion in synthetic resin. Suitable synthetic resins are e.g. thermosetting epoxy resins, step 102. In an expedient embodiment the carbon fiber layers 2, 4 together have a thickness of 50% to 75%, preferably 60% to 70%, of the total thickness of the core structure 10; expediently, the carbon fiber layers 2, 4 are of the same thickness. In a core structure 10 of the thickness of 660 μm the thickness of the carbon fiber layers 2, 4 thus amounts to e.g. around 215 μm in each case, thus around 330 μm together.

Further, a layer 3 of plastic is made available, step 104. Expediently, the plastic can be PVC or a different plastic polymer. The plastic layer 3 has a thickness of 100 to 600 μm. It is opaque in accordance with ISO/IEC 7810:2003 and expediently has the inherent color of the impregnated carbon fiber material, for example the plastic layer 3 is black.

The carbon fiber layers 2, 4 and the plastic layer 3 are so arranged above each other in a sandwich arrangement that the plastic layer 3 is disposed between the carbon fiber layers 2, 4. In this arrangement the layers 2, 3, 4 are bonded with each other, step 110. For this purpose the layers 2, 3, 4 are first placed above each other at a temperature of around 20° and subsequently heated to around 60°. The core structure 10 of the card body arises.

The core structure 10 can basically also be manufactured with only one carbon fiber layer 2 in an asymmetrical structure. It is thinner then, but correspondingly has two different surfaces. For this description the more relevant case of a symmetric structure will always be assumed.

Figure 3:
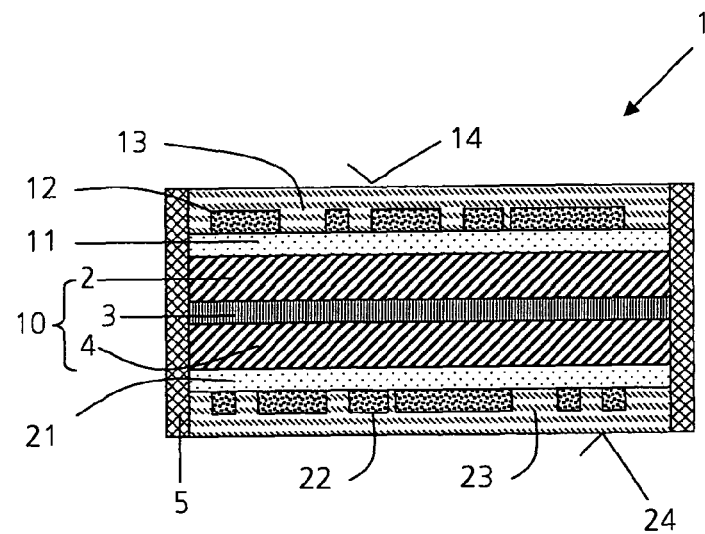

In the implementation variant shown in FIG. 3 in an optional subsequent step 112 transparent intermediate layers 11, 21 of a thickness of 10 to 300 µm, preferably of 50 to 200 µm, are laminated onto the upper sides of the core structure 10. The lamination takes place under conditions that are usual in the manufacture of chip cards. The layers 11, 21 serve as base for the subsequent printing step.

In the subsequent step 114 a graphic pattern 12, 22 is applied on one or both sides of the core structure 10 in a screen printing process. The graphic pattern can comprise surfaces, structures and/or alphanumeric characters. The graphic pattern 12, 22 can be executed differently on the sides.

For the further processing of the subsequently present half-product, two transparent or at least translucent cover layers 13, 23 are made available, step 116. The cover layers 13, 23 are thinner than the core structure 10 and have a thickness of typically 10 to 150 µm. Provided that the finished data carrier 1 is to have a magnetic stripe, one of the cover layers is equipped with a magnetic stripe. The cover layers 13, 23 can consist of PVC or a different transparent plastic material.

In the subsequent step 118 the cover layers 13 and the carbon fiber half-product are bonded with each other in a lamination process with usual lamination parameters that is usual in the manufacture of chip cards. After executing step 118, a flat, multilayered card half-product is present, which consists of the core structure 10 provided with a graphic pattern 12, 22, said core structure being covered on both sides by a thin transparent or translucent cover layer 13, 23. The surfaces 14, 24 of the card half-product correspond to the final surfaces 14, 24 of the finished portable data carrier 1 except for a subsequent personalization and/or the incorporation of an IC. Likewise, the thickness of the half-product already corresponds to the thickness of the finished chip card, in the case of a chip card with standard dimensions it thus amounts to e.g. 760 µm.

In the subsequent step 120 a card body with the final outer shape provided for the data carrier 1 is detached from the flat card half-product. The separation takes place with the aid of a separating tool that engages substantially perpendicularly to the main plane of the card half-product and is guided along a path describing the edge contour of the card body to be manufactured. The separating tool is in particular a milling tool that is operated e.g. at 56,000 rpm; besides, also sawing tools come into consideration, however to a somewhat limited extent, since carbon fiber is highly abrasive and easily leads to strong tool wear. The separating tool is so operated that through the frictional heat occurring upon separation, a fusion of the layers 2, 3, 4, 13, 23 disposed above each other takes place at the arising vertical outer edge 5.

Provided that the portable data carrier to be manufactured is of the chip card type, subsequently the steps 140, 142 take place to fabricate a cavity in the card body and to insert a chip module in the produced cavity. However, when the portable data carrier to be manufactured is for example a pure magnetic stripe card or a pure identification card without microprocessor IC or magnetic stripe, the steps 140, 142 are omitted.

In a subsequent step 130 hot stamping elements can be applied on the card body in a usual hot stamping process.

The subsequently present card body is finally personalized in a step 150. This takes place for example by applying personal data in a thermal transfer method and/or by engraving; other personalization methods that are known per se can also be used.

Figure 2:
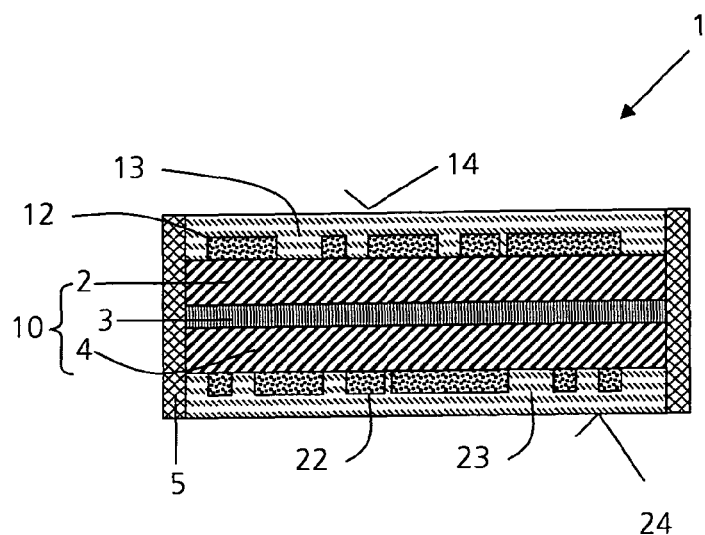
FIG. 2 a cross section of a card body manufactured according to the method, and FIG. 3 a cross section of an alternative card body manufactured according to the method.

FIG. 2 shows a cross section of a card body 1 manufactured according to the method. The thicknesses of the individual layers are not true to scale here. The card body 1 consists of a core structure which in turn consists of two carbon fiber layers 2, 4 between which an opaque plastic layer 3 is arranged. The core structure 10 is provided with graphic patterns 12, 22 on both outwardly oriented sides, on both sides of which there is finally formed respectively a further plastic layer 13, 23. The vertical outer edge 5 has an even and smooth surface.

The variant shown in FIG. 3 additionally has two transparent intermediate layers 11, 21 that are arranged respectively between the core structure 10 and the cover layers 13, 23.

Without leaving the basic idea according to the invention, the above-describe method permits a number of variations and embodiments. In particular, only one carbon fiber layer can be used instead of two carbon fiber layers. Likewise, it is possible to use three or more carbon fiber layers and to correspondingly increase the number of interposed plastic layers. The plastic cover layers 13, 23 can also be omitted both or individually or respective further layers can be applied above the cover layers. The step of separation can also take place by combination with other separation techniques, for example by the additional application of a laser or by pre-cutting the edge contour.

The invention claimed is:

1. A method for manufacturing a stiff, multilayered card body for a portable data carrier comprising the steps of:
    making available a layer of an opaque plastic;
    making available a carbon fiber layer of carbon fiber fabric;
    impregnating the carbon fiber layer with epoxy resin;
    fusing the layers to form a half-product;
    printing the upper side of the carbon fiber layer of the half-product with a graphic pattern in a screen printing process or an offset printing process; and
    detaching the card body from the half product by means of a separating tool guided relative to the half-product along a path describing the edge contour of the card body.

2. The method according to claim 1, wherein a plastic layer is laminated onto the printed upper side.

3. The method according to claim 2, wherein the plastic layer is transparent.

4. The method according to claim 1, wherein two carbon fiber layers are made available and the plastic layer is arranged between the carbon fiber layers upon lamination.

5. The method according to claim 4, wherein a graphic pattern is applied and a plastic layer is laminated on the back side of the carbon fiber layers of the half-product.

6. The method according to claim 1, wherein the temperature upon fusion amounts to 20 to 60° C.

7. The method according to claim 1, wherein the detachment takes place by means of a milling tool.

8. The method according to claim 1, wherein the card body is hot stamped.

9. The method according to claim 1, wherein the card body is personalized by a thermal transfer procedure or an engraving procedure.

10. The method according to claim 1, wherein the plastic is PVC.

11. The method according to claim 1, wherein the carbon fiber layers together have a thickness of 50% to 75% of the total thickness of the layers fused to a half-product.

* * * * *